UNITED STATES PATENT OFFICE.

JOHN WALKER AND HARRY CARVER, OF PENDLETON, ENGLAND.

WALL-COATING AND METHOD OF MANUFACTURING SAME.

SPECIFICATION forming part of Letters Patent No. 531,579, dated December 25, 1894.

Application filed October 12 1893. Serial No. 487,983. (No specimens.)

*To all whom it may concern:*

Be it known that we, JOHN WALKER and HARRY CARVER, subjects of the Queen of England, residing at Pendleton, in the county of Lancaster, England, have invented certain new and useful Improvements in Covering Substances or Materials for Wall-Papers, Paper-Hangings, Walls, or other Fabrics or Structures, of which the following is a specification.

This invention relates chiefly to the production of wall papers or hangings known as "sanitary" and to a coating for walls capable of being washed or sponged with water or with a solution containing a disinfectant or a soap without damaging the colors printed on or applied thereto either as a ground color or a pattern.

It is designed to produce a coloring material or substance to contain pigments permanent or fast to the action of moisture or a solution containing carbolic acid soap, corrosive sublimate or other disinfectant which will give much better results than have hitherto been obtainable to be applied to wall papers, calicos, walls or other fabrics or structures.

It consists essentially of a color medium or substance which when fixed or set will be impervious to moisture or disinfecting agents produced by treating or oxidizing resin and linseed oil by the action of slaked or hydrated lime, the nadding petroleum or other oily spirit, treating the same with a solution of soda and tartrate salts to emulsify it, and finally adding the material to give body to the substance and the pigment or coloring matter to give the desired tint or color.

In carrying out the invention we take the resin and fuse or melt it in a double cased pan or other suitable vessel, and while in a liquid state we add thereto a suitable quantity of fresh slaked or hydrated lime while still caustic and thoroughly mix and incorporate the two materials. The lime thus added has an oxidizing action on the resin rendering it capable of being transferred to surface printing rollers from and workable on woolen sieves, also capable of being printed from the ordinary surface roller built up of woolen material. To the mixture of resin and caustic lime (preferably while still hot) we first add and thoroughly mix with it a quantity of boiled linseed oil and then to reduce it to the required consistency to allow it to be worked by a brush or in a printing machine we add petroleum, turpentine, naphtha or other similar spirit.

We find that very satisfactory results are obtained from the following proportions of ingredients: resin two hundred and twenty-four pounds; lime (fresh burnt) with sufficient water to completely slake or hydrate it twenty pounds; linseed oil (boiled) one-half gallon; petroleum, turpentine or other oily spirit sixty to eighty gallons. To the material thus produced is added a solution of soda (preferably in the form of carbonate) and salts of tartar in water, forming an emulsion. A suitable proportion is: substance above described one hundred and eighty pounds; soda carbonate dissolved in water seven pounds; salts of tartar dissolved in water seven pounds. This mixture is next ground in a paint mill with paris white, china clay, oxide of zinc or other suitable earthy substance to give solidity and body after which a pigment of the desired color is added.

We claim—

1. The process of manufacturing a substance impervious to moisture and capable of resisting the action of strong disinfectants for coating wall-paper, paper hangings, calico, walls or other fabrics or structures, which consists of mixing with melted resin a quantity of caustic lime and linseed oil, then adding petroleum, turpentine or other oily spirit to reduce it to the required consistency, treating it with a solution of soda and tartrate salts to emulsify it, and then grinding with a suitable earthy matter, such as described, to give the desired body thereto, with the addition of a pigment or coloring matter to give the desired color or tint substantially as described.

2. A covering composition of the character described consisting of a mixture of resin, caustic lime, linseed oil, soda carbonate and salts of tartar in substantially the proportions specified, an earthy matter to give it body and a suitable color pigment.

In testimony whereof we have signed our names to this specification in the presence of two subscribing witnesses.

JNO. WALKER.
HARRY CARVER.

Witnesses:
J. OWDEN O'BRIEN,
CHAS. OVENDALE.